Aug. 31, 1937.    Ö. RISZDORFER    2,091,881
AUTOMATIC DIAPHRAGM
Original Filed July 18, 1932    2 Sheets—Sheet 1
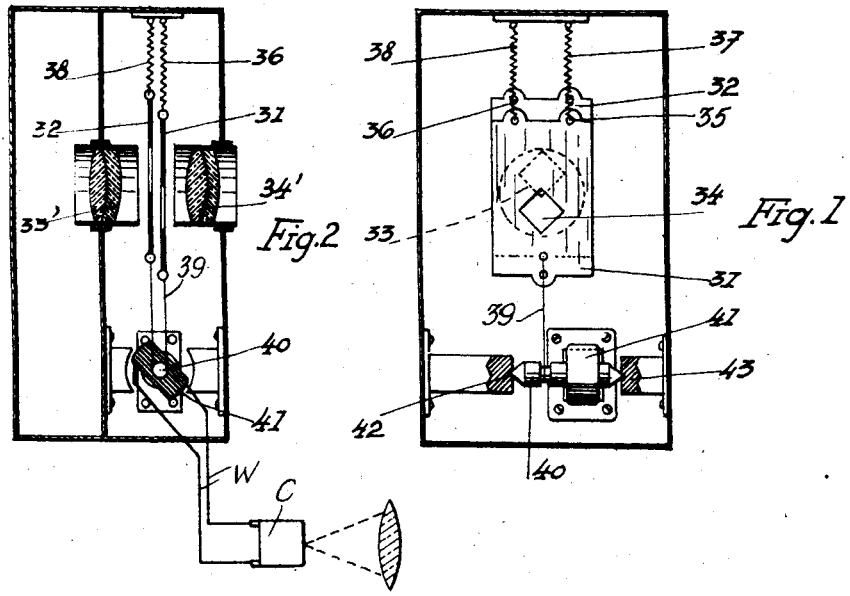
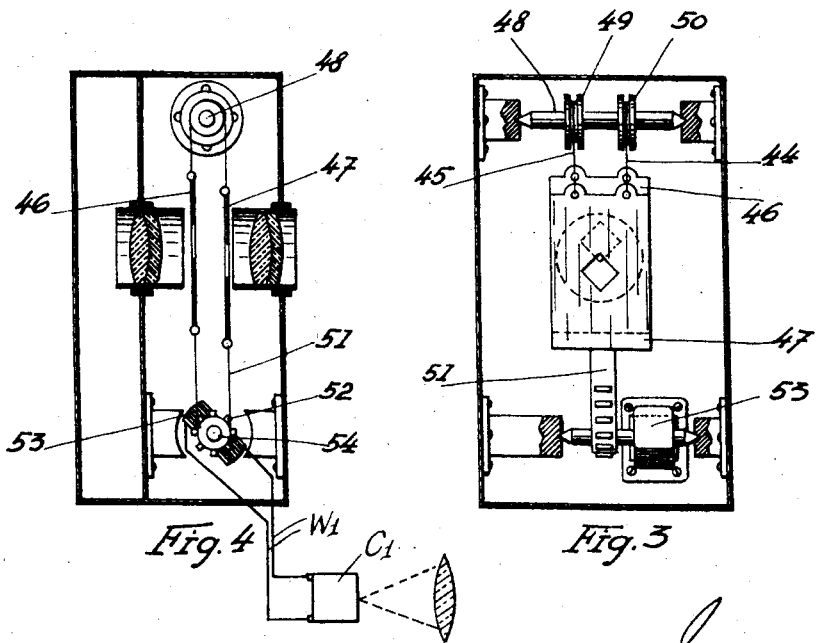

Aug. 31, 1937.  Ö. RISZDORFER  2,091,881

AUTOMATIC DIAPHRAGM

Original Filed July 18, 1932   2 Sheets-Sheet 2

Inventor:
Ödön Riszdorfer
By Franks. Appleman
Attorney

Patented Aug. 31, 1937

2,091,881

UNITED STATES PATENT OFFICE 2,091,881

AUTOMATIC DIAPHRAGM

Ödön Riszdorfer, Budapest, Hungary

Original application July 18, 1932, Serial No. 623,216. Divided and this application August 6, 1935, Serial No. 34,967. In Hungary July 18, 1931

8 Claims. (Cl. 95—64)

This invention relates to apparatus for varying the area of light apertures of photographic cameras in which apparatus the screening members defining the light apertures are moved by the influence of current of a photo-cell. The screening members are provided with openings and the said members are movably supported in order that when said members are moved relative to each other, the said openings may be brought more or less into registry in order that the light apertures may be regulated to include the full area of both of the apertures when they are alined, or restricted in area if the members are adjusted so that only portions of the light openings are in registry or alinement.

The subject matter of this application is divided from my application filed July 18, 1932, Serial Number 623,216, patented September 3, 1935, No. 2,013,362.

It is an object of this invention to yieldingly support or suspend screening members in operative relation to an object lens of a photographic camera and to provide means operated by a current of a photo-cell for moving the said members relatively, in order that openings in the said members will be brought to a greater or less degree into alinement with each other in order that light passing therethrough may be received by the lens.

A further object of the invention is to maintain the members so that the light aperture is permanently kept in the optical axis and it is immaterial from the point of view of the invention whether the diaphragm is placed in front of the object lens, behind the object lens, or between the individual lenses forming the object lens and the screening elements may be provided in such members as warranted by the conditions.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a front view of one type of diaphragm embodying the invention, composed of diaphragm elements operated by means of a cord drive from a shaft common to the said elements;

Figure 2 is an edge view thereof with the lenses in section, omitting the shaft bearing;

Figure 3 is a front view of the diaphragm and its operating mechanism, modified as compared with the construction of Figure 1 in which a gear wheel and perforated strip are employed for operating the diaphragm;

Figure 4 is an edge view thereof, omitting the bearings for the shaft;

Figure 6:
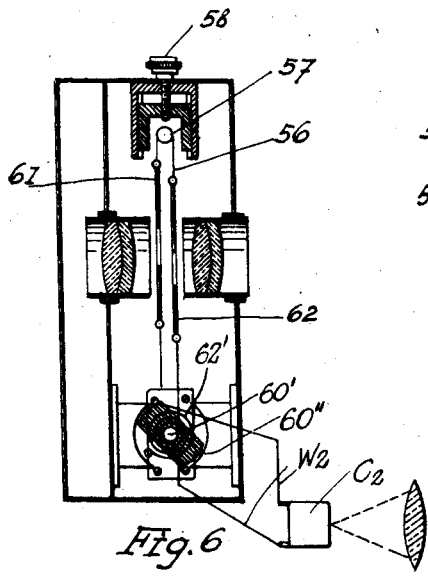
Figure 6 is an edge view thereof with the bearings of the shafts omitted and with the lens in section.

In the arrangement shown in Figures 1 and 2, the screening elements consist of two plates 31 and 32, the said plates being located in mutually parallel planes, and actuated to perform rectilinear movements, openings 33 and 34 of closed shape and mutually equal size being provided, one in each of said plates. These screening elements 31 and 32, actuated so as to move, for instance, between the two halves 33 and 34 of the object lens, have been attached to the fixed part of the photographic camera by means of the springs 35, 36 and 37, 38, respectively; the bottom ends of the plates are mutually connected by means of the cord 39. This cord may preferably be made of silk or the like. In order to insure the proper tensioned condition of the cord 39, the latter has been wound around the rotatable shaft 40 arranged at right angles to the direction of movement of the diaphragm elements. The shaft 40 carries arranged co-axially on it, the rotatable coil 41 of the magnet; the magnet itself is not shown on the drawings. This coil is fed by means of the current of a photocell C through conductors W. The shaft 40 is rotatable in the bearings 42 and 43. In the diaphragm elements, the openings 33 and 34 are arranged in such a manner as to ensure that as long as no current is flowing through coil 41, the openings will mutually cover each other, that is to say that in front of respectively behind each opening there should stand that part of the other screen where the opening of the latter is located. If a current flows through coil 41, this coil will deflect the shaft 40 to an extent corresponding to the intensity of the current and the coil is fitted in such a manner that during this deflection the plates 31 and 32 should be mutually displaced in such manner that the openings should begin to overlap. The magnitude of cover will thus diminish in proportion with the intensity of the current flowing through the coil 41. During this movement, the springs 35 and 36 of the diaphragm element moving downwards will become tensioned while the springs 37 and 38 of the other diaphragm element will become slackened. Notably, in the case shown by way of example the openings 33 and 34 have been arranged so as to make one diagonal of each slot to be located in one and the same straight line corresponding to the direction of the relative movement of the diaphragms. By these means, it has been ensured that at every position of the elements, the diaphragm will give light apertures of mutually similar shape.

Instead of suspending the spring element on springs, it is possible to suspend them on cords in the manner shown in Figures 3 and 4. In this embodiment of the invention the diaphragm elements 46 and 47, which are similar to the diaphragm elements shown in Figures 1 and 2, are suspended on two flexible members or cords 44 and 45 running over the pulleys 49 and 50 which are on the shaft 48, and the shaft is rotatably supported in bearings. On the bottom or lower edge of the diaphragm elements, the ends of a perforated strip 51 are attached to said elements and the perforations of the strip receive the teeth 52 of a gear wheel 54, which is moved by the oscillating coil 53 on the said shaft. The position of the coil 53 is controlled by current flowing from the photo-cell C¹ over the conductors W¹ connected to said coil. In other respects, the operation of the diaphragm members is similar to that of the operation of the members 31 and 32, Figures 1 and 2.

Figure 5:
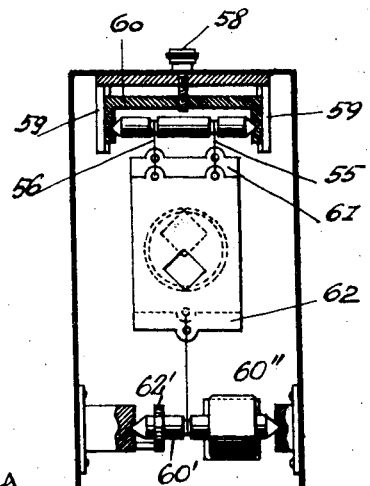
Figure 5 is a modification of means for mounting and operating the diaphragm in which an adjustable shaft and cord drive are included.

In order to adjust the tension of the flexible members or cord system for suspending and operating the diaphragm members, provision may be made for such adjustment as embodied in the disclosure of Figures 5 and 6. In this form of the invention, provision is made for adjusting the shaft over which the suspending flexible members operate toward and away from the operative shaft which is moved by the oscillating coil. Referring specifically to Figures 5 and 6, the suspending members 55 and 56 operate over a shaft 57. An adjusting screw 58 is threaded through a bracket having guides 59 and into the carrier 60 having bearings in which the shaft 57 is rotatable. By adjusting the screw 58, the carrier 60 is moved toward and away from the shaft 60' having an oscillating coil 60'' and by this means, the tensioning of the flexible members 55 and 56 is accomplished. The position of the coil 60'' is controlled by current flowing from the photo-cell C² over the conductors W² connected to said coil. The shaft 60' is under the influence of an oscillating spring 62' which counter-acts the influence of bending stresses on the shaft. The arrangement of the adjustable carrier for the shaft as disclosed in Figures 5 and 6 may also be used for adjusting the tension of springs where the spring suspension such as shown in Figures 1 and 2 is employed. While it has been stated that the adjustment of the carrier 60 with respect to the shaft 60' is in the direction of movement of the diaphragms, it is not absolutely necessary that it should be adjusted in the said direction of movement of the diaphragms for as a matter of fact it is possible to deflect the cords 55 and 56 in other directions by means of guiding rollers.

Figure 8:
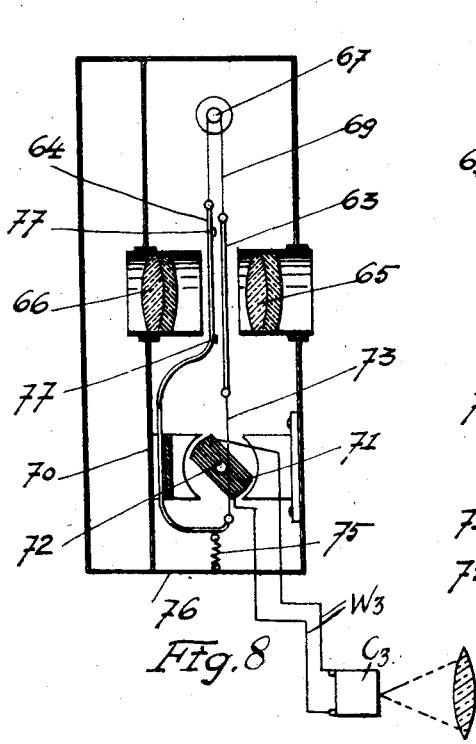
Figure 8 is an edge view thereof omitting the bearings for the shafts.
Figure 7:
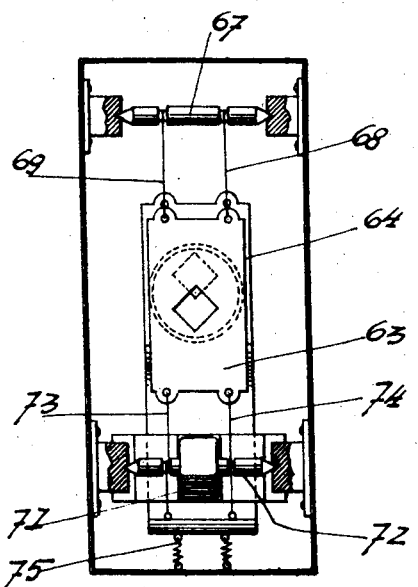
Figure 7 illustrates a further modified construction embodying the invention including the means for balancing one of the shafts.

In the case of the arrangement shown in Figures 5 and 6, where the shaft is influenced by the oscillating spring 62', the shaft is stressed in one direction by the suspension described, and the shaft is subjected to bending stress. This stress increases the friction of the shaft in its bearings and the arrangement shown in Figures 7 and 8 has the purpose of reducing shaft friction. In this embodiment, the movement of the screen elements 63 and 64 takes place between the parts 65 and 66 of the objective lens. The elements 63 and 64 are suspended from a shaft 67 by means of flexible elements or cords 68 and 69. On the lower edge of one of the screening elements, viz: of the screening element 64, there is attached an extension 70 which is bent outwardly and formed in U-shape, and it is in this outwardly bent part of the extension that the oscillating coil 71 moves. The position of the coil 71 is controlled by current flowing from the photo-cell C³ over the conductors W³ to the said coil. The lower end, or end portion, of the extension projects upward and flexible connections 73 and 74 have their ends connected to the extension 70 and to the screen elements 63, the said flexible members or cords being wound around the shaft 72 in order that the screen elements may be moved by the rotation of the said shaft. A tensioning member such as a spring 75 is connected to the extension 70 and to a fixed portion of the photographing apparatus and is operative to exert a pull on the said extension 70. The spring tends to draw the screen element 64 downwardly and the spring tension is regulated in such a manner as to make the tensions of the part above the shaft and the part below the shaft of the flexible elements or cords 73—74 equal to prevent the shaft 72 from being subjected to any uni-lateral pull. It will be noted that in the drawings the diaphragms are spaced a considerable distance from each other. This has been done to more clearly disclose how the several parts operate and, as will be obvious, the two diaphragm members of each pair must, as in all photographic shutters, lie as close together as possible without the operation of sliding past one another being prevented or retarded.

I claim:

1. In a photographic apparatus, a casing wherethrough a light beam may pass, a rotative electro-magnetic element journaled in the casing at one side of the beam path and including a winding of conductive wire, a pair of screens each having an opening therein, said screens extending across the beam path, flexible means connected to corresponding ends of said screens and passing around the rotary element whereby rotation of said element moves the screen openings into and out of registry, said electro-magnetic element being variably positioned on its axis of rotation in accordance with the energization thereof, and means for energizing the winding including a photo-cell and conductive connections between the cell and winding.

2. In a photographic apparatus, a casing wherethrough a light beam may pass, a rotative electro-magnetic element journaled in the casing at one side of the beam path and including a winding of conductive wire, a pair of screens each having an opening therein, said screens extending across the beam path, flexible means connected to corresponding ends of said screens and passing around the rotary element whereby rotation of said element moves the screen openings into and out of registry, spring means urging the screens away from the rotative means whereby to maintain tension on the flexible element, said electro-magnetic element being variably positioned on its axis of rotation in accordance with the energization thereof, and means for energizing the winding including a photo-cell and conductive connections between the cell and winding.

3. In a photographic apparatus, a casing wherethrough a light beam may pass, a rotative element journaled in the casing at one side of the beam path, a pair of screens each having an opening therein, said screens extending across the beam path, flexible means connected to corresponding ends of said screens and passing around the rotary element whereby rotation of said element moves the screen openings into and out of registry, and electro-magnetic means to vary the position of the rotary element and thereby control the extent of registration of the said openings, said electro-magnetic means including a rotary magnetic member carrying said rotary element, fixed poles between which said rotary member is positioned, a winding for energizing said magnetic member, a photo-cell, and conductive connections between the cell and winding.

4. In a photographic apparatus, a casing wherethrough a light beam may pass, a rotative element journaled in the casing at one side of the beam path, a pair of screens each having an opening therein, said screens extending across the beam path, flexible means connected to corresponding ends of said screens and passing around the rotary element whereby rotation of said element moves the screen openings into and out of registry, spring means urging the screens away from the rotative means whereby to maintain tension on the flexible element, and electro-magnetic means to vary the position of the rotary element and thereby control the extent of registration of the said openings, said electro-magnetic means including a rotary magnetic member carrying said rotary element, fixed poles between which said rotary member is positioned, a winding for energizing said magnetic member, a photo-cell, and conductive connections between the cell and winding.

5. In a photographic apparatus, a casing wherethrough a light beam may pass, a rotative electro-magnetic element journaled in the casing at one side of the beam path and including a winding of conductive wire, a pair of screens each having an opening therein, said screens extending across the beam path, flexible means connected to corresponding ends of said screens and passing around the rotary element whereby rotation of said element moves the screen openings into and out of registry, a second rotary element on the side of the beam path opposite the first rotary element, a second flexible element connecting the remaining end of the screen and passing around the second rotary element, said electro-magnetic element being variably positioned on its axis of rotation in accordance with the energization thereof, and means for energizing the winding including a photo-cell and conductive connections between the cell and winding.

6. In a photographic apparatus, a casing wherethrough a light beam may pass, a rotative electro-magnetic element journaled in the casing at one side of the beam path and including a winding of conductive wire, a pair of screens each having an opening therein, said screens extending across the beam path, flexible means connected to corresponding ends of said screens and passing around the rotary element whereby rotation of said element moves the screen openings into and out of registry, a second rotary element on the side of the beam path opposite the first rotary element, a second flexible element connecting the remaining end of the screen and passing around the second rotary element, one of said flexible elements constituting a sprocket chain and the rotary element whereon it engages being a sprocket meshing with said chain, said electro-magnetic element being variably positioned on its axis of rotation in accordance with the energization thereof, and means for energizing the winding including a photo-cell and conductive connections between the cell and winding.

7. In a photographic apparatus, a casing wherethrough a light beam may pass, a rotative element journaled in the casing at one side of the beam path, a pair of screens each having an opening therein, said screens extending across the beam path, flexible means connected to corresponding ends of said screens and passing around the rotary element whereby rotation of said element moves the screen openings into and out of registry, a second rotary element on the side of the beam path opposite the first rotary element, a second flexible element connecting the remaining end of the screen and passing around the second rotary element, and electro-magnetic means to vary the position of one of the rotary elements and thereby control the extent of registration of the said openings, said electro-magnetic means including a rotary magnetic member carrying said rotary element, fixed poles between which said rotary member is positioned, a winding for energizing said magnetic member, a photo-cell, and conductive connections between the cell and winding.

8. In a photographic apparatus, a casing wherethrough a light beam may pass, a rotative element journaled in the casing at one side of the beam path, a pair of screens each having an opening therein, said screens extending across the beam path, flexible means connected to corresponding ends of said screens and passing around the rotary element whereby rotation of said element moves the screen openings into and out of registry, a second rotary element on the side of the beam path opposite the first rotary element, a second flexible element connecting the remaining end of the screen and passing around the second rotary element, one of said flexible elements constituting a sprocket chain and the rotary element whereon it engages being a sprocket meshing with said chain, and electro-magnetic means to vary the position of one of the rotary elements and thereby control the extent of registration of the said openings, said electro-magnetic means including a rotary magnetic member carrying said rotary element, fixed poles between which said rotary member is positioned, a winding for energizing said magnetic member, a photo-cell, and conductive connections between the cell and winding.

ÖDÖN RISZDORFER.